April 28, 1970     D. W. JONES     3,508,418
SPLINE CLOSURE SEAL
Filed July 30, 1968

INVENTOR
David W. Jones.
BY
ATTORNEYS.

United States Patent Office 3,508,418
Patented Apr. 28, 1970

3,508,418
SPLINE CLOSURE SEAL
David W. Jones, East Northport, N.Y., assignor to C. E. Conover & Co., Inc., Fairfield, N.J., a corporation of New Jersey
Filed July 30, 1968, Ser. No. 748,775
Int. Cl. F16d 3/06
U.S. Cl. 64—23                    7 Claims

ABSTRACT OF THE DISCLOSURE

The combination of a seal on which a splined shaft, at the end of the sleeve into which the splines of the shaft fit, forms a closed cavity in the sleeve in which lubrication can be entrapped, excludes air, ambient moisture and abrasive particles so that the spline connection operates for a much longer time without deterioration. The elastomeric device used to make the seal is so shaped and of such elastic properties that it can be combined with conventional spline connections with little or no reworking of the metal parts.

SUMMARY OF THE INVENTION

Predesigned splines are generally open, unlubricated and evidence short life and extreme wear. The nature of a splined connection in rotation creates an unaligned joint both in parallelism and concentricity. This dynamic misalignment causes sever abrasion, friction and galling, the subsequent result being self-destruction.

This invention provides a spline closure which creates a sealed cavity into which lubrication may be introduced either by continuous feed or by initial application. The entrapped lubricant plus the exclusion of external ambient moisture and abrasive particles greatly extends the life of the working spline. The elastomeric sealing device is preferably constructed so that it is symmetrical about a mid point of its axial length and it can be assembled either end facing the spline cavity. The sealing device has an undistorted inside diameter less than the outside diameter of the shaft beyond the splines so that the device grips the shaft with sufficient force to discourage seal travel on the shaft in operation. The outside of the sealing device fits into the spline cavity in a manner similar to the operation of an O-ring and with sufficient squeeze to seal effectively beyond the ends of the splines.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DESCRIPTION OF THE PREFERRED EMBODIMENT

Figure 1:
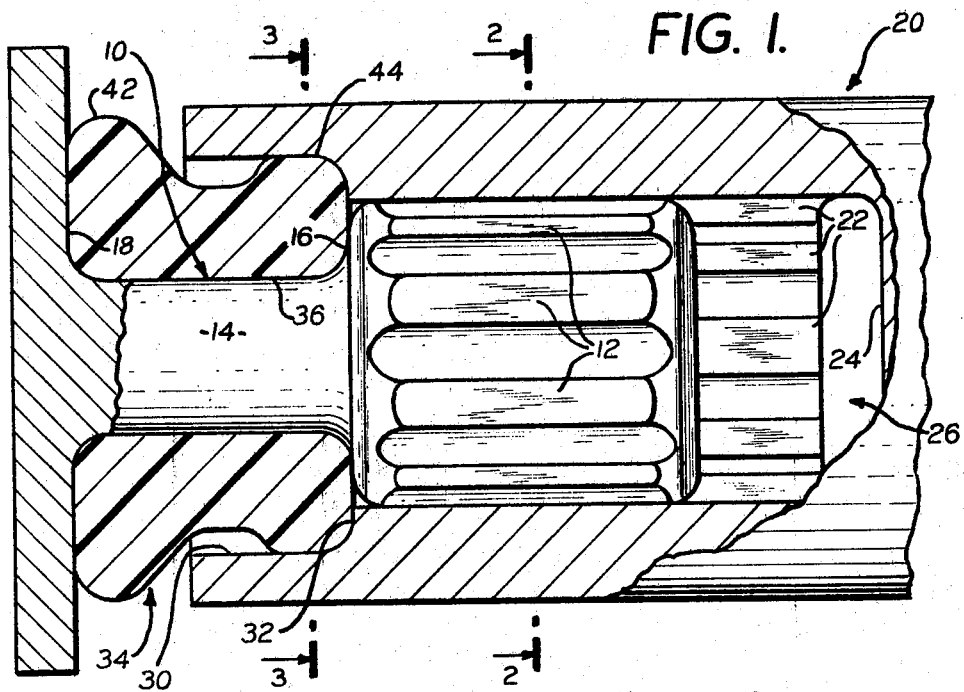
FIGURE 1 is a fragmentary sectional view showing a spline connection made in accordance with this invention.
Figure 2:
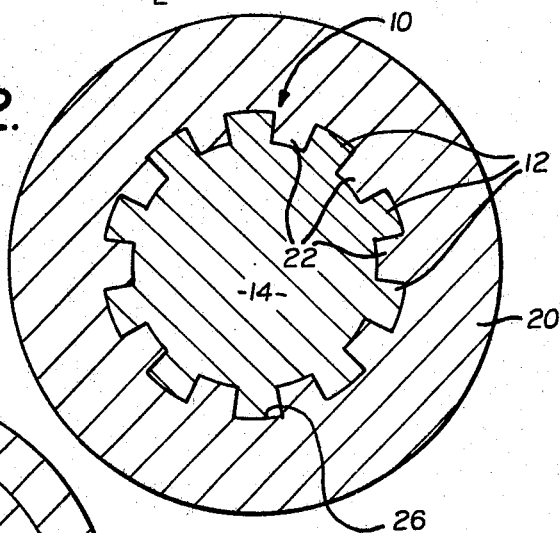
FIGURES 2 and 3 are sectional views taken on the lines 2—2 and 3—3, respectively, of FIGURE 1.
Figure 3:
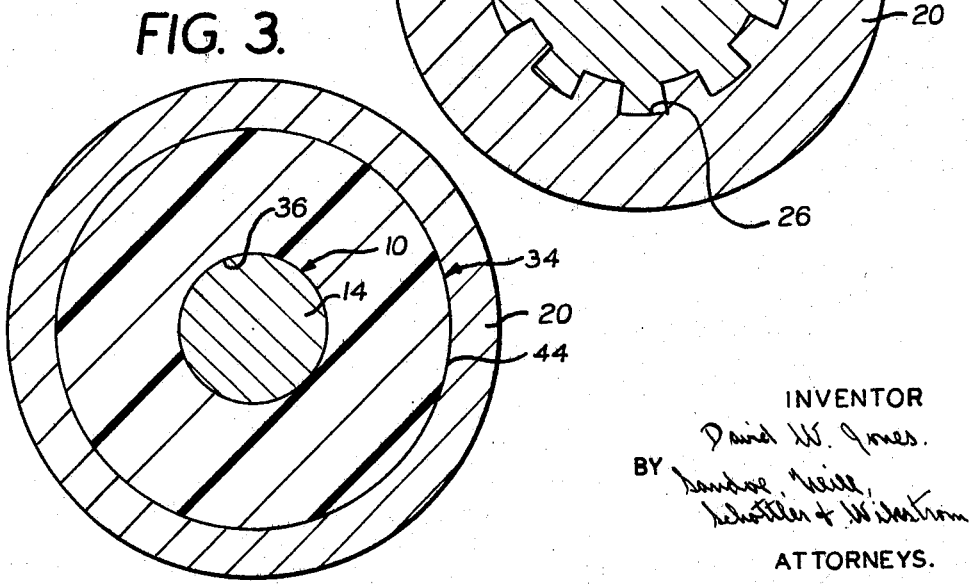

FIGURE 1 shows a spline connection including a shaft 10 with splines 12 thereon at one end of the shaft. In the construction illustrated, the shaft 10 has a cylindrical portion 14 beyond the ends of the spline 12 and a shoulder 16 at the end of the cylindrical portion 14 adjacent to the ends of the splines 12. There is another shoulder 18 at the other end of the cylindrical portion 14. This shoulder 18 is shown as a flange, but it may be a mere increase in diameter of the shaft 14 if a longer shaft is used.

The spline connection includes also a sleeve 20 having complementary splines 22 in position to engage the splines 12 of the shaft. A short distance beyond the inner ends of the splines 22 there is an end wall 24 which extends across the sleeve to close the sleeve and to form a chamber.

The sleeve 20 has a counterbore 30 at its left-head end and has a shoulder 32 where the counterbore 30 meets the splined portion of the sleeve. The inside wall of the sleeve 20 along the length of the counterbore 30 is cylindrical, and it receives one end of an elastomeric sealing device 34.

The elastomeric sealing device 34 is preferably made of polytetrofluoroethylene because of its low coefficient of friction; but other plastics can be used. The sealing device 34 has an undistorted shape of generally dumbbell contour with an axially extending opening 36. The inside diameter of the opening 36 is originally about 10% less than the outside diameter of the cylindrical portion 14 of the shaft 10. The sealing device 34 is compounded to have elastic properties which permit it to be stretched sufficiently to pass over the splines 12 and the sealing device 34 is continuous around its circumferential extent so that after passing over the splines 12, it contracts to grip the cylindrical portion 14 with a firm grip.

The sealing device 34 has a larger diameter end portion 42 at its left-hand end and a similar large-diameter end portion 44 at its right hand end. These portions 42 and 44 are of the same diameter and contour in the original undistorted sealing device 34; but when the shaft 10 is inserted into the sleeve 20, the end portion 44 of the sealing device 34 is compressed radially into the counterbore 30 so that it is squeezed between the side of the counterbore and the cylindrical portion 14 of the shaft in the same manner as an O-ring.

The end portion 44 of the sealing device 34 is held against the shoulder 32 of the counterbore by the shoulder 18 at the other end of the cylindrical portion 14 of the shaft and thus the end portion 44 closes the clearance between the shaft 10 and the sleeve 20 at the ends of the splines. The chamber 26 in the sleeve 20 can be considered as extending to the shoulder 32 and the sealing device 34 is, therefore, a closure at the end of the chamber 26 opposite the wall 24. This chamber can be originally packed with lubricant when the spline is assembled, or it can be supplied with lubricant through passages leading into the chamber 26 through a wall of the sleeve 20 or lengthwise through the shaft 14.

The spacing of the end of the sleeve 20 from the shoulder 18 of the shaft 10 is determined by the design of the mechanical parts to which the sleeve and shaft are connected. All spline connections have means for maintaining the parts with the complementary splines within axial limits and this construction forms no part of the present invention.

The sealing device 34 is designed for use with a particular spline connection; and the original outside diameter of the end portions 42 and 44 are correlated with the inside diameter of the counterbore 30 to obtain the desired squeeze of the end of the sealing device 34 which fits into the counterbore. This is determined in a manner similar to that used for determining the optimum range of squeeze for O-rings. In the preferred construction, the squeeze of the end portion 44 is kept to a value which produces friction between the sealing device 34 and the wall of the counterbore 30 less than the friction of the sealing device 34 on the cylindrical portion 14 of the shaft. In this way, the sliding contact of the sealing device 34 is between the sealing device and the sleeve and there is no sliding motion of the sealing device on the cylindrical portion 14 of the shaft. The undistorted diameter of the opening 36 through the sealing device 34 is, therefore, correlated with the squeeze of the end portion 44 of the sealing device by the wall of the counterbore 30. The squeeze depends, of course, upon the pressure necessary to seal the chamber 26 against escape of lubricant and against entrance of air, moisture and dirt from outside the sleeve. In practice, it has been found that a squeeze of 10% gives good results. This value is given merely by way of illustration.

There are two advantages in having the sealing device 34 of generally dumbbell contour. One is that the reduced-diameter portion toward the center of the sealing device provides flexibility so that the part which contacts with the shoulder 32 and the circumferential wall of the counterbore can operate more in the nature of an O-ring while still held against rolling. The other advantage is that the sealing device 34 can be assembled with the shaft 10 with either end of the sealing device applied first and it is impossible to put the sealing device on backwards.

In the undistorted sealing device 34, before application to the shaft 10, the maximum radial thickness of the sealing device is between about one and a half and two times the minimum radial thickness of the sealing device at its mid region. Changes in diameter of the sealing device 34 are progressive and the points of maximum diameter are well back from the ends of the sealing device so that the portion which contacts with the inside wall of the counterbore 30 has its pressure increased progressively from the end to a maximum and then decreased progressively in the same manner as an O-ring.

What is claimed is:

1. A mechanical drive including a shaft having splines thereon, a sleeve into which the shaft extends and in which there are complementary splines which engage those on the shaft, the inside wall of the sleeves having a cylindrical portion beyond the splines of the sleeve and near the end of the sleeve into which the shaft extends, an elastomeric sealing device on the shaft and extending into the cylindrical portion of the sleeve and squeezed between the shaft and said cyclindrical portion of the sleeve, and means holding the sealing device against axial movement toward said end of the sleeve, the cyclindrical portion of the sleeve being a counterbore of larger diameter than the maximum inside diameter of the sleeve at the splines of the sleeve.

2. The mechanical drive described in claim 1 characterized by the shaft having a cylindrical portion beyond the splines of the shaft and located within at least a part of the length of the cylindrical portion of the sleeve.

3. The mechanical drive described in claim 2 characterized by the sealing device being of continuous circumferential extent and having an undistorted inside diameter approximately 10% less than the outside diameter of the cylindrical portion of the shaft on which the sealing device is located, and the sealing device having an undistorted outside diameter approximately 20% greater than the inside diameter of the cylindrical portion of the sleeve with which the sealing device contacts, the sleeve being closed beyond the ends of the splines remote from the sealing device to form a chamber; and said sealing device closing the clearance around the shaft at the other end of the chamber to retain lubricant therein and to prevent entrance of external moisture and dirt into the chamber.

4. The mechanical drive described in claim 1 characterized by the shaft having a cylindrical portion beyond the ends of the splines of the shaft, shoulders at both ends of said cylindrical portion, and the elastomeric sealing device being of continuous circumferential extent and surrounding the cylindrical portion of the shaft from one shoulder to the other so that said shoulders serve as the means for holding the sealing device against axial movement, and said sealing device being stretchable within its elastic limit to pass over the larger diameter portion of the shaft beyond one end of said cylindrical portion of the shaft.

5. The mechanical drive described in claim 4 characterized by part of the cylindrical portion of the shaft being within the sleeve and part of it being beyond the end of the sleeve, the elastomeric sealing device having a generally dumbbell contour in the direction of its length, one of the larger diameter ends of the sealing device being compressed within the sleeve and the other larger diameter end of the sealing device being beyond the end of the sleeve and not in contact with the sleeve.

6. The mechanical drive described in claim 1 characterized by the end of the counterbore that is nearer to the splines in the sleeve being a shoulder with which the innermost end of the sealing device contacts, and a shoulder on the shaft beyond the end of the sleeve and beyond the splines of the shaft holding the sealing device in contact with the shoulder in the counterbore.

7. The mechanical drive described in claim 1 characterized by the shaft extending for only a portion of the length of the sleeve, and the sleeve being closed at a location spaced from the end of the shaft to form a chamber portion beyond the splines of the shaft, the closing of the space in the sleeve that contains the splines being completed by said sealing device beyond the other side of the splines on the shaft.

References Cited
UNITED STATES PATENTS

| | | | |
|---|---|---|---|
| 2,116,290 | 5/1938 | Spicer | 64—23 |
| 3,016,722 | 1/1962 | Batdorf | 64—23 |
| 3,410,355 | 11/1968 | Garrett | 64—23 |

JAMES A. WONG, Primary Examiner

U.S. Cl. X.R.

277—207, 212; 287—53